Aug. 30, 1949. K. RATH 2,480,162
METHOD OF MAKING SOUND PICTURE FILMS
Filed Dec. 8, 1947
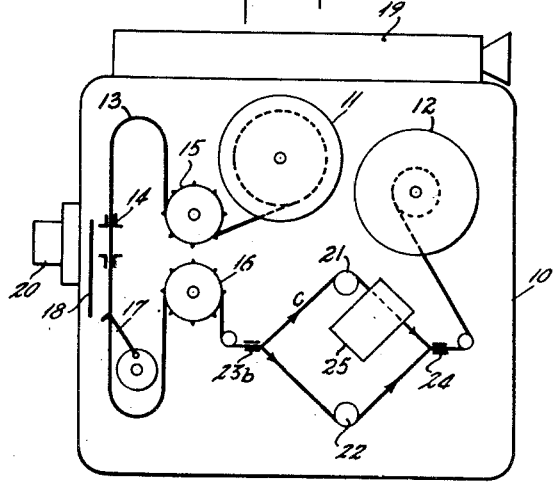
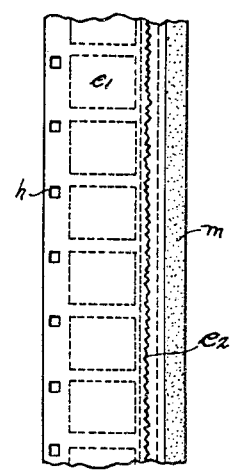
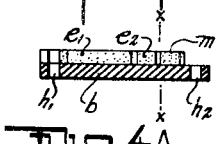
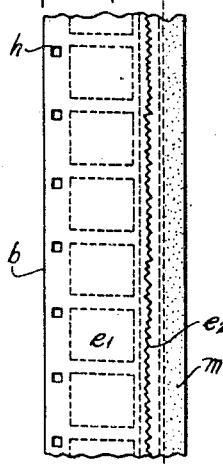
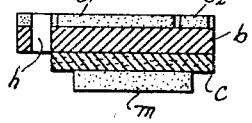
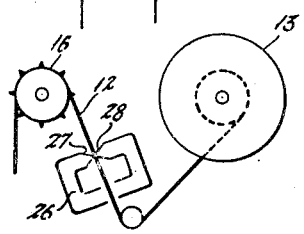
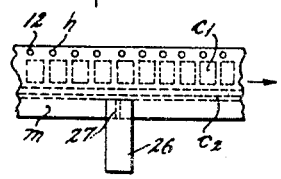
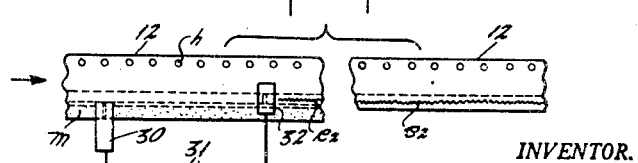
INVENTOR.

Patented Aug. 30, 1949

2,480,162

UNITED STATES PATENT OFFICE 2,480,162

METHOD OF MAKING SOUND PICTURE FILMS

Karl Rath, New York, N. Y., assignor of one-half to Peter F. Rossmann, Depew, N. Y.

Application December 8, 1947, Serial No. 790,423

6 Claims. (Cl. 88—16.2)

1

The present invention relates to sound films, more particularly to a novel method of and means for producing sound-on-film records of the type insuring perfect synchronism between the action of the picture and the accompanying sounds such as speech and/or other sound effects.

In the co-pending application Ser. No. 743,490, filed jointly by Peter F. Rossmann and the present applicant on April 24, 1947, entitled Means for and method of producing sound films, there is described a sound moving picture film and a method of making the same, comprising a common carrier for the picture and both a magnetic and a photographic sound track, the magnetic sound track being readily removable and serving for synchronously recording the picture and accompanying sounds in a camera, while the photographic track serves for projection of the film in a standard projector after transferring the magnetically recorded sound to the photographic track during the processing operation of the film and subsequently removing the magnetic sound track from the film. In this manner, sound-on-film can be easily recorded magnetically with relatively simple means and at reasonable cost, while the final film obtained may be projected by means of a standard photographic sound projector and may be duplicated by means of the usual photographic printing methods.

More particularly, according to said co-pending application, the composite picture and sound film comprises a film base provided with the usual photographic picture and sound track emulsion areas as well as a magnetic sound track in the form of a layer of finely divided magnetizable material applied to or otherwise carried by a non-magnetic tape or ribbon superimposed upon said film.

In arrangements of this type, the magnetic sound track overlies the picture and/or photographic emulsion areas and accordingly great care has to be taken in passing the film through the magnetic recording head to prevent scratching or other damage to the sensitive emulsion. In practice, this may be achieved by using a sufficiently wide air gap through which the film passes in the recording magnet or to line the pole pieces of the magnet with a soft material. In either case, increase of the air gap involves an increase of the magnet and in turn an increase of the strength of the recording electric currents supplied by the usual microphone and amplifier circuit. This in turn results in increased bulk and weight of the entire recording apparatus which is objectionable if easy portability

2 and handling of the sound recording camera are desired.

Accordingly, it is an object of the present invention to overcome the above drawbacks in a simple and efficient manner and to substantially eliminate any possibility of the sensitive photographic emulsion of the film being affected by the presence of the magnetic recording apparatus.

With this basic object in view, the invention involves generally the provision of a composite sound and picture film and recording apparatus therefor, as well as a method of recording and processing such a film, whereby only the parts or portions of the film carrying the magnetic sound track passes through the recording or pick-up magnet, while the portions carrying the photographic picture and sound track emulsions are passed through the camera in the ordinary manner, substantially without being in any way affected by the magnetic recording apparatus. According to a preferred embodiment of the invention, this is achieved by the use of a film of greater than standard width with the projecting marginal area being provided with the magnetic sound track to be recorded in the camera simultaneously with a picture. After the magnetic sound has been transferred to photographic sound upon the same film during the processing operation, the magnetic track is removed by slitting the film longitudinally to result in a film of standard width suitable for projection by means of a standard photographic sound projector. Since the magnetic sound track, in a film of this type, is in non-overlapping relation to the emulsion of the film, scratching or other damage thereto is substantially avoided.

Other objects as well as novel aspects of the invention will in part become apparent and will in part be particularly pointed out, as the following description of a few practical embodiments thereof proceeds, taking in reference to the accompanying drawing forming part of this specification and wherein:

Figure 1 illustrates schematically a portable motion picture camera embodying sound recording means constructed in accordance with the principles of the invention;

Figure 2 is a cross-section through a composite sound film suitable for use in a camera of the type according to the invention, with the thicknesses of the various elements shown on a greatly exaggerated scale for ease of illustration;

Figures 3A and 3B are plan and cross-sectional views, respectively, of a modified form of sound film according to the invention;

Figure 4A is a plan view and Figure 4B a corresponding cross-sectional view of another type of composite photographic and magnetic sound film embodying the principles of the invention;

Figure 4C shows a cross-section through still a further composite sound and picture film constructed in accordance with the invention;

Figures 5 and 6 are fractional front and side views diagrammatically illustrating the recording of the sounds in the camera; and Figure 7 is a diagram illustrating the conversion of the recorded magnetic sounds into photographic sound during the processing operation of the film.

Like reference characters identify like parts in the different views of the drawing.

Referring to Figure 1, there is shown schematically a portable motion picture camera of generally known construction, comprising a body or casing 10 having mounted therein film supply- and take-up spools 11 and 12 and means for moving the film 13 through the film or picture gate of the camera, said means comprising a pair of sprocket or guide rollers 15 and 16 and a reciprocating claw mechanism 17, all of usual construction. The film 13 is arranged to form suitable loops and additional known means may be provided to insure a smooth and uniform movement of the film through the sound pick-up device to be described hereafter. Item 18 indicates the usual rotary shutter, 20 represents the lens of the camera and 19 is a view finder of any known construction. Other details like the driving motor, microphone and amplifier etc. are omitted from the drawing in order to simplify the disclosure and as being unnecessary for the understanding of the invention.

The composite film for use in the camera according to Figure 1 is of the type comprising a separate base for both the film and magnetic sound track preferably adhesively applied to each other, as described in greater detail in the above mentioned copending application and shown in cross-section in Figure 2. In the latter, the normal film base is shown at $b$ consisting of Celluloid, cellulose acetate etc. and being provided with sprocket holes $h$ along one edge thereof. Film $b$ has applied to it the usual picture and photographic emulsion areas as shown at $e_1$ and $e_2$, respectively, in accordance with standard sound film practice well known to those skilled in the art. Applied to the opposite side of the film $b$, advantageously by means of suitable adhesive, is a magnetic tape or ribbon comprising a separate base or carrier $c$ of paper, a plastic or the like and having applied thereto or incorporated therein a layer $m$ of finely divided magnetizable material as described and disclosed in greater detail in said co-pending application.

After a film of the above described type has passed through the picture gate of the camera in Figure 1 and around the sprocket 16, the film base $b$ and magnetic tape $e$ are temporarily separated after passing through a suitable guide 23. The separated film and sound track tape after passing over suitable sprocket or guide rollers 21 and 22, respectively, are then re-united or superimposed again by passing through a guide 24. On its way from guide 23 to guide 24, the magnetic tape $c$ is passed through the recording or pick-up head 25 which may be designed for optimum recording conditions without regard to the photographic film, as is understood. In particular, an arrangement of this type makes it possible to have the magnetic track extend over substantially the entire width of the film, thus resulting in an increased magnetic flux and in turn reduced bulk and size of the recording apparatus.

As is understood, the magnetic tape $c$ may be superimposed upon the film base with or without a suitable adhesive, or the adhesive may be applied only at spaced intervals to prevent relative longitudinal displacement of the film and the sound track carrier and to insure perfect synchronism during re-recording the magnetic sound upon the photographic track $e_2$.

According to a further embodiment of the invention, as shown in Figure 3A and Figure 3B, the magnetic tape or ribbon $c$ applied to the underside of the film $b$ has a portion $c'$ projecting laterally from the film in the manner shown in the drawing. In an arrangement of this type, the magnetic sound track $m$ will be in non-overlapping relation to both the picture and photographic sound track emulsion areas $e_1$ and $e_2$ and the composite film and tape may be passed through a recording magnet 26 having pole pieces 27 and 28 cooperating only with the projecting magnetic track area, as shown more clearly in Figures 5 and 6. In this manner, the emulsion areas $e_1$ and $e_2$ will be in no manner endangered by the magnetic recording apparatus and a separation of the film and magnetic tape as in Figure 1 will not be required. The magnetic tape is again removed after transfer of the magnetically recorded sound to a photographic record upon the track $e_2$ during the processing operation of the film. As is understood, the picture may be developed either to a positive or a negative, depending on whether the film is intended for direct use in a projector or for duplication to provide a number of copies, respectively.

According to an alternative construction of a film of the type of Figure 3A and 3B, the film base $b$ is extended laterally beyond its standard width and the projecting marginal area provided with the magnetic sound track $m$, as shown more clearly in Figure 4A and 4B. In this case, the sound is again recorded together with the picture in the camera in the manner indicated in Figures 5 and 6. After the film has been processed, i. e. after transfer of the magnetic record upon the track $m$ to the adjacent photographic track $e_2$ in the processing station, the film is slit along the line $x$—$x$ to remove the magnetic track and to provide a final film of standard width ready for projection in a standard sound projector.

According to a modification of a sound film of this type as shown in Figure 4C, the projecting marginal portion of the film carrying the magnetic sound track $m$ also includes a series of sprocket holes $h_2$ in addition to the sprocket holes $h_1$ along the opposite edge of the film. This will insure a more accurate and smooth guidance of the film through the camera as is understood. Again, after the magnetic sound has been recorded in the camera together with the picture, the sound record is transferred to the normal photographic sound track $e_2$ and the marginal area containing both the magnetic track $m$ and the sprocket holes $h_2$ removed by slitting the entire film longitudinally along the line $x$—$x$, whereby obtain a normal or standard film ready for projection by means of a standard sound projector. Thus, in case of 16 mm. sound film of well known type comprising sprocket holes along one edge and a photographic sound track along the opposite edge of the film, the original width of the film may be about 20 mm., i. e. providing an area of 4 mm. width for the magnetic track with or without auxiliary sprocket holes and resulting in a final film of standard width of 16 mm. after processing and slitting of the film in the manner described.

Referring to Figure 7, there is illustrated schematically the conversion of the magnetically recorded sound into photographic sound upon the same film during the film processing operation. The sound currents produced by the magnetic pick-up or recording head 30 which may be similar to the recording head in the camera, are amplified by means of a standard audio amplifier 31 and the amplified currents applied to a photographic recorder 32 of well known construction and spaced by a predetermined distance from the pick-up 30 to result in a desired relation or displacement of the final sound and picture record in accordance with standard practice. Subsequently, the portion of the film carrying the magnetic sound track m is removed by slitting the film longitudinally in the manner described and shown at the right hand side of the drawing. The amplifier is advantageously provided with a volume control resistor 33 for monitoring the sound output current and additional means may be provided for disconnecting the sound current and superimposing other desired sound effects, as is readily understood.

While there have been described and disclosed a few desirable embodiments of the invention, it is understood that this disclosure is for the purpose of illustration and that various changes in shape, proportion and arrangements of parts, as well as the substitution of equivalent elements and steps for those herein shown and described, may be made without departing from the scope and spirit of the invention. The specification and drawing are accordingly to be regarded in illustrative rather than in a limiting sense.

I claim:

1. The method of making sound motion picture film comprising the steps of producing upon a single film synchronously with a picture a magnetic sound record upon a marginal area adjacent to one edge of said film, reproducing the recorded magnetic sound and rerecording it photographically upon an adjoining area of said film, and trimming said film to remove said marginal area and magnetic sound record.

2. The method of making sound motion picture film for use in a standard photographic sound projector comprising the steps of producing upon a single film synchronously with a picture a magnetic sound record upon the excess marginal area adjacent to an edge of a film having a width greater than standard width, reproducing the recorded magnetic sound and rerecording it upon an adjoining area of said film, and trimming said film to standard width.

3. The method of making sound motion picture film comprising the steps of producing upon a single film synchronously with a picture a magnetic sound record upon an area adjacent to a marginal edge of a film, reproducing the recorded sound and rerecording it photographically as a second sound record upon a different area of said film adjacent to the picture areas, and trimming said film to remove said marginal area and magnetic sound record.

4. The method of making sound motion picture film comprising the steps of simultaneously producing, upon a film carrying a photographic emulsion and having a marginal area provided with a magnetic sound track coating, a latent picture record and a magnetic record of sound accompanying the picture, thereafter passing said film in succession through a magnetic sound reproducing and photographic recording apparatus for photographically rerecording the reproduced sound upon a longitudinal emulsion area adjacent to the picture areas of said film, to produce an additional latent photographic sound record upon said film, slicing said film longitudinally to permanently remove said magnetic sound record, and developing both said latent photographic picture and sound records.

5. The method of making sound motion picture film comprising the steps of simultaneously producing, upon a film carrying a photographic emulsion and having a marginal area in excess to the normal standard width of a photographic sound film and being provided with a magnetic sound track coating, a latent picture record and a magnetic record of sound accompanying the picture, thereafter passing said film in succession through a magnetic sound reproducing and photographic recording apparatus for rerecording the reproduced sounds upon a longitudinal emulsion area adjacent to the picture areas of said film, to produce a latent photographic sound record adjacent to said magnetic record, and processing and slicing said film longitudinally to permanently remove said excess marginal area and magnetic sound track and to provide a sound film of standard width suitable for projection by a standard photographic sound-on-film projector.

6. The method of making sound motion picture film comprising the steps of simultaneously producing, upon a film carrying a photographic emulsion and having a marginal area in excess to the normal standard width of a photographic sound film and being provided with a magnetic sound track coating, a latent picture record and a magnetic record of sound accompanying the picture, thereafter passing said film in succession through a magnetic sound reproducing and photographic recording apparatus for rerecording the reproduced sounds upon a longitudinal emulsion area adjacent to the picture areas of said film, to produce a latent photographic sound record adjacent to said magnetic record, developing said film and longitudinally trimming it to standard width to remove said excess marginal area and magnetic sound track and to provide a film of standard width suitable for projection by a standard photographic sound-on-film projector.

KARL RATH.

REFERENCES CITED

The following references are of record in the file of this patent:

UNITED STATES PATENTS

| Number | Name | Date |
| --- | --- | --- |
| 1,808,046 | Kuchenmeister | June 2, 1931 |
| 1,829,912 | Shearer | Nov. 3, 1931 |
| 1,825,598 | Vogt et al. | Sept. 29, 1931 |
| 1,835,743 | Hster | Dec. 8, 1931 |
| 1,866,712 | Jones | July 12, 1932 |
| 1,883,559 | Chipman | Oct. 18, 1932 |

FOREIGN PATENTS

| Number | Country | Date |
| --- | --- | --- |
| 389,434 | Great Britain | Mar. 16, 1933 |
| 569,426 | Great Britain | May 23, 1945 |